United States Patent
Karimli et al.

(10) Patent No.: US 10,210,864 B2
(45) Date of Patent: Feb. 19, 2019

(54) VOICE COMMAND FOR COMMUNICATION BETWEEN RELATED DEVICES

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/394,037

(22) Filed: Dec. 29, 2016

(65) Prior Publication Data
US 2018/0190273 A1    Jul. 5, 2018

(51) Int. Cl.
| | |
|---|---|
| *G10L 15/22* | (2006.01) |
| *G10L 15/02* | (2006.01) |
| *G10L 15/06* | (2013.01) |
| *G10L 15/30* | (2013.01) |
| *G10L 25/51* | (2013.01) |
| *G06F 3/16* | (2006.01) |
| *G10L 15/10* | (2006.01) |

(52) U.S. Cl.
CPC .............. *G10L 15/22* (2013.01); *G06F 3/167* (2013.01); *G10L 15/02* (2013.01); *G10L 15/063* (2013.01); *G10L 15/30* (2013.01); *G10L 25/51* (2013.01); *G10L 15/10* (2013.01); *G10L 2015/223* (2013.01)

(58) Field of Classification Search
USPC ........................................ 704/270, 275, 273
See application file for complete search history.

(56) References Cited

U.S. PATENT DOCUMENTS

| | | | |
|---|---|---|---|
| 6,401,063 B1* | 6/2002 | Hebert | G10L 17/04 704/234 |
| 6,842,510 B2* | 1/2005 | Sakamoto | G10L 17/00 379/102.01 |
| 9,043,210 B1* | 5/2015 | Adcock | G10L 15/183 379/88.01 |
| 9,118,669 B2 | 8/2015 | Moganti et al. | |
| 9,805,370 B1* | 10/2017 | Quigley | G06Q 20/4014 |
| 2006/0041926 A1* | 2/2006 | Istvan | H04N 5/4403 725/133 |
| 2012/0020466 A1 | 1/2012 | Dunsmuir | |
| 2014/0249817 A1 | 9/2014 | Hart et al. | |
| 2014/0278440 A1* | 9/2014 | Chung | G06F 3/167 704/275 |

(Continued)

OTHER PUBLICATIONS

PCT Search Report and Written Opinion dated Mar. 30, 2018 for PCT Application No. PCT/US17/66304, 16 pages.

*Primary Examiner* — Abul Azad
(74) *Attorney, Agent, or Firm* — Lee & Hayes, P.C.

(57) ABSTRACT

Methods and computing systems for enabling a voice command for communication between related devices are described. A training voice command of a user is processed to generate a voice command signature including a content characteristic and a sound characteristic. When the user wishes to transfer an on-going packet data session from a current device to a related device, the user inputs the same voice command. The voice command will be analyzed with the voice command signature to determine a correspondence before being executed.

17 Claims, 4 Drawing Sheets

(56) References Cited

U.S. PATENT DOCUMENTS

| | | | |
|---|---|---|---|
| 2015/0026580 A1* | 1/2015 | Kang | G06F 3/167 |
| | | | 715/728 |
| 2015/0187359 A1 | 7/2015 | Bhaskaran | |
| 2015/0237486 A1 | 8/2015 | Lauder | |
| 2015/0379993 A1* | 12/2015 | Subhojit | G10L 15/06 |
| | | | 704/275 |
| 2016/0142409 A1* | 5/2016 | Frei | H04L 63/0884 |
| | | | 713/176 |

* cited by examiner

VOICE COMMAND FOR COMMUNICATION BETWEEN RELATED DEVICES

BACKGROUND

Users have multiple telecommunication devices such as cellular phones, tablet computers, laptops, and other devices. Each device may have its own communication address, such as a telephone number, and may receive communications directed to any communication address associated with a service account.

In (IP) Multimedia Subsystem (IMS), call forking may be achieved through implicit registration sets (IRS). With IRS, when any one network identity (e.g., IP Multimedia Public Identifier (IMPU)) associated with a communication address is registered, other network identities associated with a same service account as that network identity are also registered. When a communication is received and directed to any one network identity of the registration set, it may be sent to all network identities of that registration set.

Session Initiation Protocol (SIP), as extended by RFC 3265 ("Session Initiation Protocol (SIP)-Specific Event Notification", June 2002), utilizes a subscribe method to request a current state as well as state updates from a remote node. The specification for Open Mobile Alliance (OMA) Presence SIMPLE (SIP for Instant Messaging and Presence Leveraging Extensions) defines mechanisms for utilizing SIP to perform instant messaging and other functions. Rich Communication Services (RCS) is a GSM Association (GSMA) program that provides for inter-operability within an IP Multimedia Subsystem (IMS). One feature of RCS is the ability to discover capabilities of contacts. RCS utilizes OMA SIMPLE for various features, including subscription to a presence server to obtain capability information for a list of contacts.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In examples of the present disclosure, voice command is enabled for inter-device communication, e.g., transferring packet data sessions between related devices. A group of related devices includes devices that are associated with the same subscriber account, sharing the same cellular telephone line, and so forth. Devices sharing the same account are often associated with an international mobile subscriber identity (IMSI). Devices sharing the same telephone line may be configured to send, receive, and initiate, cellular communications using a shared identifier, communications address, and so forth, such as a telephone number, MSISDN (sometimes referred to as the "Mobile Station International Subscriber Directory Number"), IP Multimedia Public Identifiers (IMPU), and so forth. In the disclosure herein, a "device" may be a physical device or may be a "virtual" device. Thus, devices are related in some examples based on their being associated with the same "account" (e.g., associated with an IMSI), associated with the same "line" (e.g., associated with the same telephone number), associated with the same hardware system, and so forth. For example, related to devices may be multiple devices sharing a same phone number and/or one physical device having multiple numbers (i.e., multiple "virtual" devices). Related devices include devices for which a packet data session (e.g., calls, live messages, or downloading of multimedia files) initiated with one device may be transferred to another device to continue and/or complete the packet data session. Further, a device is not limited to a mobile terminal or a computing device in a traditional view, and may include any devices capable of inter-device communication. For example, a "device" may include a smart home/connected home device, like a connected appliance. Inter-device communication includes any communication between related devices. For example, inter-device communication includes, but is not limited to, transferring a packet data session between/among related device and sharing a packet data session between/among device. For another example, inter-device communication may include upgrading and/or changing a format of a packet data session between/among multiple related devices. For example, an inter-device communication may upgrade a voice call conducted on one device to a video call conducted on another related device.

Various examples of the present disclosure are described below in reference to the figures.

Figure 1:
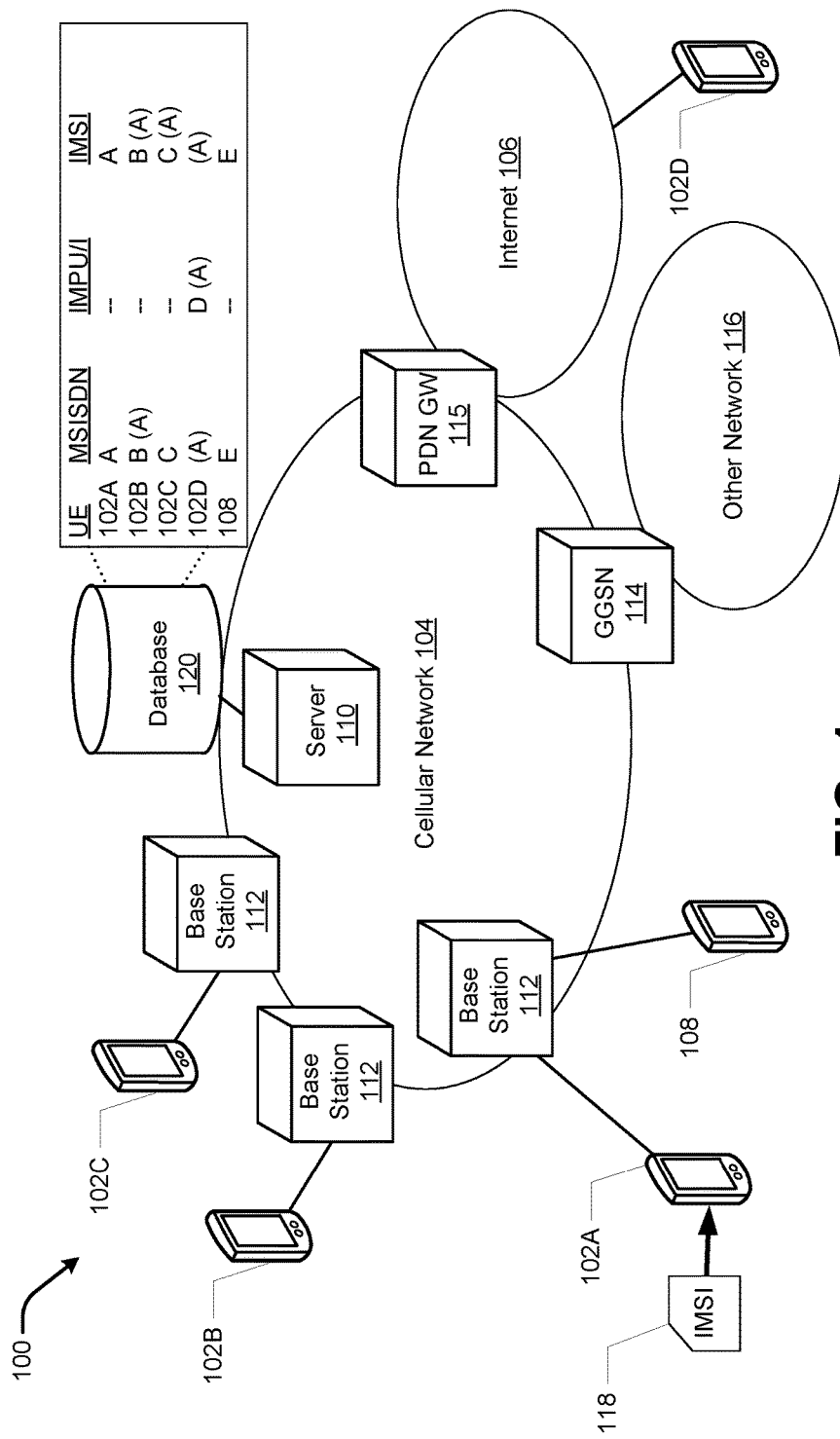
FIG. 1 illustrates an example environment for inter-device communication among related devices.

FIG. 1 illustrates an environment 100 of related devices 102 where an inter-device communication, e.g., transferring a packet data session between related computing devices ("device") 102 (shown as devices 102A-D for illustration only) may happen, and where a voice command(s) may be used. As an illustrative example, related device 102A may operate an on-going packet data session with an external source, such as via a unicast, broadcast, or multicast source on the cellular network 104, the Internet 106, from another device 108 (e.g., a mobile device that does not share a line and/or subscriber account with device 102A), or from some other external source (e.g., a content website). As used herein, the "external source" is any source/device other than related devices 102A-D. The related device 102A is enabled to transfer the on-going packet data session to other related devices 102, e.g., as illustrated, devices 102B-D.

There are various approaches to effect an inter-device communication, e.g., transferring an on-going packet data session between/among related devices 102, and each and all are included in the disclosure. In an example, the inter-device communication may be implemented through a server 110. Server 110 may be a SIP server, and the related device 102A may be configured to utilize OMA Presence SIMPLE to obtain presence information regarding one or more related devices, e.g., the related devices 102B and 102C. The related devices 102A-D are configured in some examples to provide their presence information to the presence server 110. The related devices 102A-D may be configured in some embodiments to provide availability (capabilities) information. The availability information may indicate an availability to accept a transfer of an on-going packet data session. In other examples, the related devices 102A-D may obtain each other's presence information and capacity to accept a transfer in other ways, such as through static configuration, peer-to-peer connections, and so forth.

The cellular network 104 may be responsible for routing packet data session such as voice call, to external networks, such as the Internet 106. For example, the cellular network may include a Gateway GPRS Support Node (GGSN) 114 or a packet data network gateway (PDN GW) 115, or another equivalent node. The user equipment (UE), e.g., the related devices 102A-D and the other device 108, may include one or more of a smart phone, a personal digital assistant, a netbook, a laptop computer, a smart appliance, and/or another electronic device that are capable of operating packet data session (e.g., voice or multimedia data) via the cellular network 104, internet 106 (e.g., through a Wi-Fi network), or other access network 116.

A computing device, such as the related devices 102A-D, and the device 108, may include a subscriber identity module (SIM) card 118, which has an international mobile subscriber identity (IMSI) stored thereon. An IMSI is a unique 64-bit number. Within a GSM network, the IMSI is associated with the MSISDN, sometimes referred to as the "Mobile Station International Subscriber Directory Number," or more commonly as the telephone number. The MSISDN is a unique number that identifies a subscription on a GSM network and is also the number that can be used to place a call to the GSM phone. The MSISDN is not necessarily stored on the SIM card 118 or the phone, and the MSISDN is not permanently associated with the IMSI. The MSISDN may change if the subscription changes, for example.

As an illustrative non-limiting example of related devices 102, multiple UEs may be registered with a common number (e.g., MSISDN, IMPU, IMPI, etc.), and may be associated with a common subscriber account (e.g., IMSI), and thus are "related devices" as used herein. For example, all related devices 102A-D may have their own unique IMSI programmed into their respective SIM cards, and which are associated with a specific telephone number (MSISDN), which may also be unique to each related device 102A-D. But the IMSI and MSISDN pair may associated in the network with "alias numbers" to allow for shared lines and/or shared accounts, thereby making them related devices. For example, the IMSI and MSISDN associations for related devices 102A-D are stored in a database 120. Related device 102A is associated with IMSI A and MSISDN A. Related device 102B is associated with IMSI B and MSISDN B, but also with alias MSISDN A and alias IMSI A. Thus, related device 102B is associated both with the same account and with the same line as related device 102A. Related device 102C is associated with IMSI C and MSISDN C, but also with alias IMSI A. Thus, related device 102C shares an account (IMSI A) but not a telephone line with related device 102A. Some related devices (e.g., related device 102D), which may not capable of connecting through a base station of the cellular network 104, may also register with the cellular network 104 through the Internet 106 (or other short range communication technologies like Bluetooth, near field communication (NFC), etc.) using a unique identifier, such as an IMPI or IMPU, a globally routable user agent URI (GRUU), or other. These identifiers may take the form of a telephone number (e.g., they may resemble an MSISDN). The cellular network 104 forwards calls and messages to the related device 102D, and the related device 102D may be enabled to send or receive shared content in a same or similar way as with related devices 102A-C. As illustrated in database 120 in FIG. 1, related device 102D is associated with IMPU D, and also with alias IMPU A. Related device 102D therefore shares a telephone line with related devices A and B and an account with related devices A, B, and C.

Server 110 may retrieve the association data that corresponds to the IMSI, IMPU/IMPI of the related devices 102A-D from the database 120. The data may include information specifying the associated device number (e.g., a MSISDN, IMPI, IMPU, or the like) for which the related devices 102A-D are able to utilize for initiating, transferring and accepting an inter-device communication event, e.g., transferring a packet data session(s). In some embodiments, a related device 102 may request from the server 110 a list of related devices 102A-D.

Figure 2:
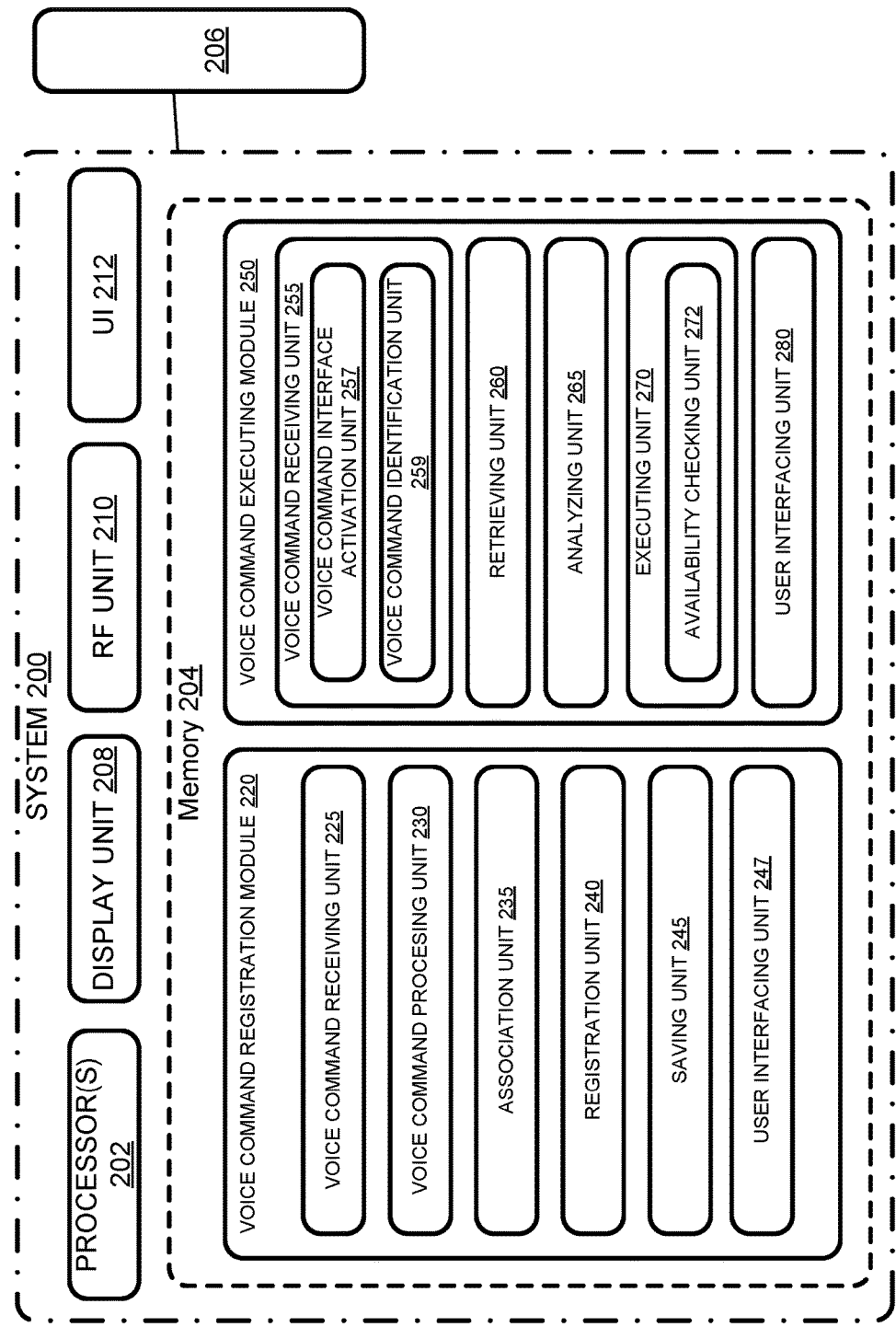
FIG. 2 illustrates an example system for enabling voice command for inter-device communication among related devices.

FIG. 2 illustrates an example system 200 configured to support a voice command for inter-device communications including, e.g., transferring a packet data session among/between related devices 102. Some or all components of system 200 may be included in related devices 102 and/or server 110 or in both with a functional coordination(s), and all possibilities are included in the disclosure. As illustrated in FIG. 2, system 200 may include processor(s) 202 and memory 204. A voice recognition device 206 may be communicatively coupled to system 200 (which also include the configuration that voice recognition device 206 is included in system 200). Voice recognition device 206 may be physically included in device 102 or may be a separate device communicatively coupled to device 102 to function with system 200. System 200 may also include a display unit 208, a radio frequency (RF) unit 210 and a user interface (IU) 212.

System 200 may include a voice command registration module 220 and a voice command executing module 250. Voice command registration module 220 may include a voice command receiving unit 225, a voice command processing unit 230, an association unit 235, a registration unit 240, a saving unit 245 and a user interfacing unit 247. Voice command executing module 250 may include a voice command receiving unit 255 including a voice command interface activation unit 257 and a voice command identification unit 259, a retrieving unit 260, an analyzing unit 265, an executing unit 270 including an availability checking unit 272, and a user interfacing unit 280. Voice command registration module 220 and voice command executing module 250 may share or each include a user interfacing unit 247, 280 respectively.

Voice recognition device 206 may include any now existing and/or future developed device capable of sensing a voice. Any and all possibilities are included in the disclosure, and none limits the scope of the disclosure.

In operation, voice command registration module 220 is configured to train device 102 and/or server 110 for a voice command of a user. As a voice command may be processed to train the system instead of actual execution, for ease of illustration, a "training voice command" may be used to refer to a voice command processed by voice command registration module 220.

Specifically, voice command receiving unit 225 is configured to receive a training voice command of a user through voice recognition device 206. The training voice command may include a content specified by the user for an inter-device communication event between related devices 102. For an illustrative example, a voice content may be "Transfer to Device 102B." It should be appreciated that the training voice command may include contents for more than one inter-communication events, for an illustrative example, "Transfer to Device 102B and Upgrade to Video Call."

Voice command processing unit 230 is configured to process the received training voice command to generate a voice command signature. In an example, the processing may identify a content characteristics and a sound characteristic of the training voice command, both of which being included in the generated voice command signature. In an example, both the content characteristic and the sound characteristic of the voice may be digitalized. The separation of content characteristic and sound characteristic may enable a differentiated treatment of the two characteristics. For example, the sound characteristic is personalized to the user and is unique, which may work as a biometric identifier of the user. Thus, in an example, more information security measures may be used to process and store the sound characteristic portion of the training voice command. Further, the processing may also include a tokenization procedure, where a randomly generated token is appended to the digitalized content characteristic and/or the sound characteristic. Examples of a randomly generated token may include a security key, a one-time password, or other dynamically generated forms of tokens. It should be appreciated that the voice command processing may be implemented locally (within a single device 102 or server 110) or may be implemented in a distributed computing manner through, e.g., cloud computing.

Association unit 235 is configured to associate the voice command signature with an executable command of inter-device communication among/between related devices 102, for illustrative example, device 102A and device 102B. The association could be implemented in various manners and all are included in the disclosure. The executable command is the command that user prefers to activate and/or execute through a voice command under training. For illustrative example, the example training voice command "Transfer to Device 102B" may be associated to an executable command to transfer an on-going packet data session from a related device 102 to related device 102B. In an example, the association may be achieved by association unit 235 in coordination with user interfacing unit 247 such that a user's input may be taken in effecting the association. For example, a user may select an executable command from a list of executable commands to associate with the voice command signature.

Registration unit 240 is configured to register the voice command signature as associated with the executable command. The registration may be performed with a server of inter-device communication, e.g., server 110 or other servers, or may be performed with other related devices 102. As related devices 102 may be linked through server 110, the registration with server 110 may make the voice command signature as associated with the executable command available (e.g., accessible/retrievable) to other related devices 102.

Saving unit 245 is configured to cause to save the voice command signature in a manner that the saved voice command signature is configured to be retrieved in an inter-device communication event. In an example, if the associated executable command is intended to be executed by a specific related device 102, e.g., the current device 102A receiving the training voice command, the voice command signature may be saved locally on the specific related device 102. If the associated executable command is intended to be executed by multiple related devices 102, for example, a user may prefer that all related devices 102 can execute the trained "Transfer to Device 102B" voice command, the voice command signature may be saved in a server, e.g., sever 110, accessible by all related devices 102.

Voice command executing module 250 is configured to process a candidate voice command in an inter-device communication event. If the candidate voice command is authenticated as a valid voice command based on an analysis of the candidate voice command in relation to the saved voice command signature, the candidate voice command will be caused to execute. "Candidate" is used to refer to that the voice command may need to be authenticated before execution.

Specifically, voice command receiving unit 255 is configured to receive a candidate voice command through voice recognition device 206. The received candidate voice command could be in various digitalized format(s) and all are included in the disclosure. In an example, the received candidate voice command may be in a same format as the training voice command received by voice command receiving unit 225. In an example, voice command receiving unit 255 may share the same hardware and/or software element(s) as voice command receiving unit 225.

Voice command interface activation unit 257 is configured to activate an interface for receiving a candidate voice command. The interface may be activated in different stages of receiving a candidate voice command. In an example, voice command interface activation unit 257 is configured to activate an interface before receiving the voice command and the interface may function to pause the relevant on-going packet data session, e.g., a voice call, and switch to the function and/or environment to receive a candidate voice command. In another example, voice command interface activation unit 257 is configured to activate an interface after detecting a candidate voice command for receiving. For example, a candidate voice command may be detected from a background, like an on-going voice conversation (packet data session), and an interface and/or dialog may be activated for a user to confirm the detected candidate voice command is a voice command the user intends to input.

Voice command identifying unit 259 is configured to identify a candidate voice command over an on-going packet data session operated on related device 102. Various approaches to identify a voice command over an on-going packet data session may be used, and any and all are included in the disclosure. For example, voice command identifying unit 259 may identify a candidate voice command either as a foreground task or a background task. The on-going packet data session may be paused or may continue. As described herein, after a candidate voice command is identified/detected, a user interface may be activated for a user to confirm the candidate voice command.

Retrieving unit 260 is configured to retrieve the saved voice command signature. In an example, the retrieval may include converting the voice command signature into a format suitable for an analysis with respect to the received candidate voice command.

Analyzing unit 265 is configured to analyze the received candidate voice command in relation to the retrieved voice command signature to determine a correspondence. There are various approaches to determine a correspondence between the received candidate voice command and the retrieved voice command signature, and all are included in the disclosure. In an example, analyzing unit 265 may process the received candidate voice command to identify a candidate content characteristic and a candidate sound characteristic. Then the candidate content characteristic and the candidate sound characteristic may be compared with the content characteristic and the sound characteristic of the voice command signature, respectively, to determine a correspondence on each one.

In real world, a user's candidate voice command may deviate from the saved voice command signature of the same user. In an example, analyzing unit 265 may apply a tolerance range(s) in determining the correspondence. The tolerance range(s) may be determined based on machine learning or experimental data. In an example, the tolerance ranges applied for the candidate content characteristic and the candidate sound characteristic may vary. Sound characteristic of voice command signature is related to the biometric identification of the user who inputted and saved the voice command signature such that a tighter tolerance may be set for the candidate sound characteristic to be determined as corresponding. On the other hand, for candidate content characteristic, the tolerance range may be relatively loose. For example, instead of saying the saved "Transfer to Device 102B", a candidate voice command may include "Transfer Talk to Device 102B" or "Go to Device 102B", which may be acceptable as corresponding in content characteristic.

Executing unit 270 is configured to cause to execute the executable command associated to the voice command signature upon it is determined that the received candidate voice command corresponds to the retrieved voice command signature. In an example, executing unit 270 may include an availability checking unit 272 configured to check, e.g., through server 110, the availability of other related device 102 to participate into the inter-device communication event. For example, in the illustrative example voice command, "Transfer to Device 102B", availability checking unit 272 may check whether related device 102B is available to accept the transfer.

It should be appreciated that some or all of the units/components of system 200 may reside on related device 102 and/or may reside on server 110, or any combinations thereof. Further the functions of any or all of the units/components may be effected through interactions between a related device 102 and server 110, e.g., through an application installed in device 102 for inter-device communication. In an example, device 102 may include units for direct user interaction, including portions of the voice command receiving unit 225/255 and user interfacing unit 247/280, and may communicate with server 110 on a received voice command (training voice command and/or candidate voice command) and may interact with server 110 on the functions of other units of voice command registration module 220 and voice command executing module 250.

Figure 3:
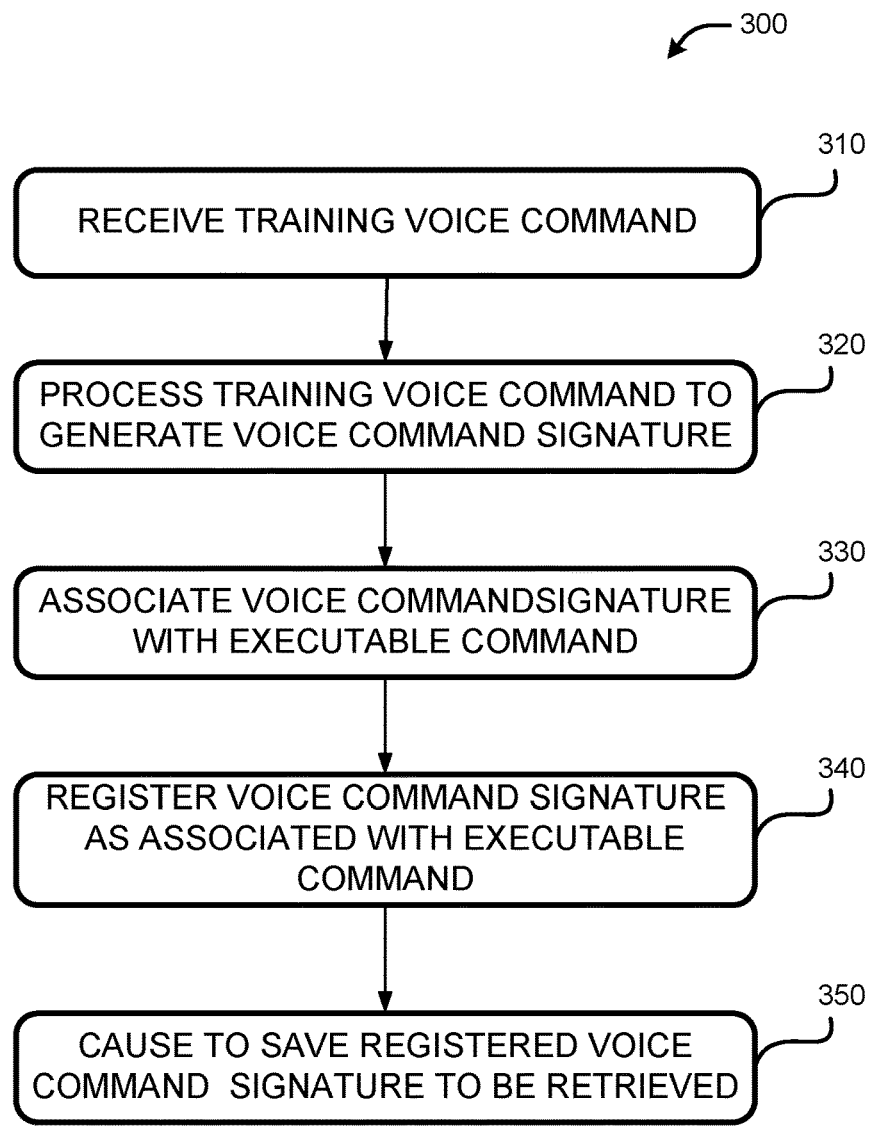
FIG. 3 illustrates an example operation process of the system of FIG. 2.

FIG. 3 illustrates an example process 300 of voice signature registration module 220 of system 200. In example operation 310, voice receiving unit 225 may receive a training voice command of a user through voice recognition device 206 communicatively coupled to related device 102 (for illustrative example, device 102A). The training voice command may include a content specified by the user for an inter-device communication event between related devices 102. For an illustrative example, a voice content may be "Transfer to Device 102B."

In example operation 320, voice command processing unit 230 may process the received training voice command to generate a voice command signature. In an example, the processing may identify the content characteristics and the sound characteristic of the training voice command. In an example, both the content characteristic and the sound characteristics may be included in the voice command signature. In an example, more information security measures may be used to process and store the sound characteristic portion of the voice command signature. Both the content characteristic and the sound characteristic of the training voice command may be digitalized. Further, the processing may also include a tokenization procedure, where a randomly generated token is appended to the digitalized content characteristic and/or the sound characteristic. Examples of a randomly generated token may include a security key, a one-time password, or other dynamically generated forms of tokens.

In an example, the user may already train system 200 with other training voice commands and the sound characteristic of the user may already be stored in system 200. The current sound characteristic of the current training voice command may be used to update/harmonize the existing sound characteristics. It should be appreciated that the training voice command processing may be implemented locally within related device 102A or may be implemented by a server 110, e.g., through cloud computing, or some combinations of the local and cloud based processing.

In example operation 330, association unit 235 may associate the voice command signature with an executable command of inter-device communication between/among related devices 102, for illustrative example, device 102A and device 102B. The association could be implemented in various manners and all are included in the disclosure. In an example, the association may be performed by association unit 235 in coordination with user interfacing unit 247 such that a user's input is taken in effecting the association. For example, a user may choose an executable command from a list of executable commands to be associated with the voice command signature.

In example operation 340, registration unit 240 may register the voice signature as associated with the executable command with a server of inter-device communication, e.g., server 110 or other servers, or with other related devices 102 through peer-to-peer connection. In an example, the registration may also include or relate to an authentication procedure where the user's identity may be verified. All methods of identity verification may be possible and all are included in the disclosure. In an example, if the user's sound characteristic is already authenticated and stored with system 200, the authentication may be done automatically by comparing the sound characteristic of the current training voice signature with the stored sound characteristic.

In example operation 350, saving unit 245 may cause to save a voice command signature in a manner that the saved voice command signature is configured to be retrieved in an inter-device communication event. In an example, if the associated executable command is intended to be executed by a specific related device 102, e.g., the current device 102A receiving the training voice command, the voice signature may be saved locally on the specific related device 102. If the associated executable command is intended to be executed by multiple related devices 102, for example, a user may prefer that all related devices 102 other than related device 102B can execute "Transfer to Device 102B" command, the voice command signature may be saved in a server accessible by all related devices 102. In an example, if the sound characteristic of the user is already stored with system 200, the sound characteristic of the current voice signature may not need to be saved again, and the already save sound characteristic of the user may be linked to the current content characteristic in the saving.

Figure 4:
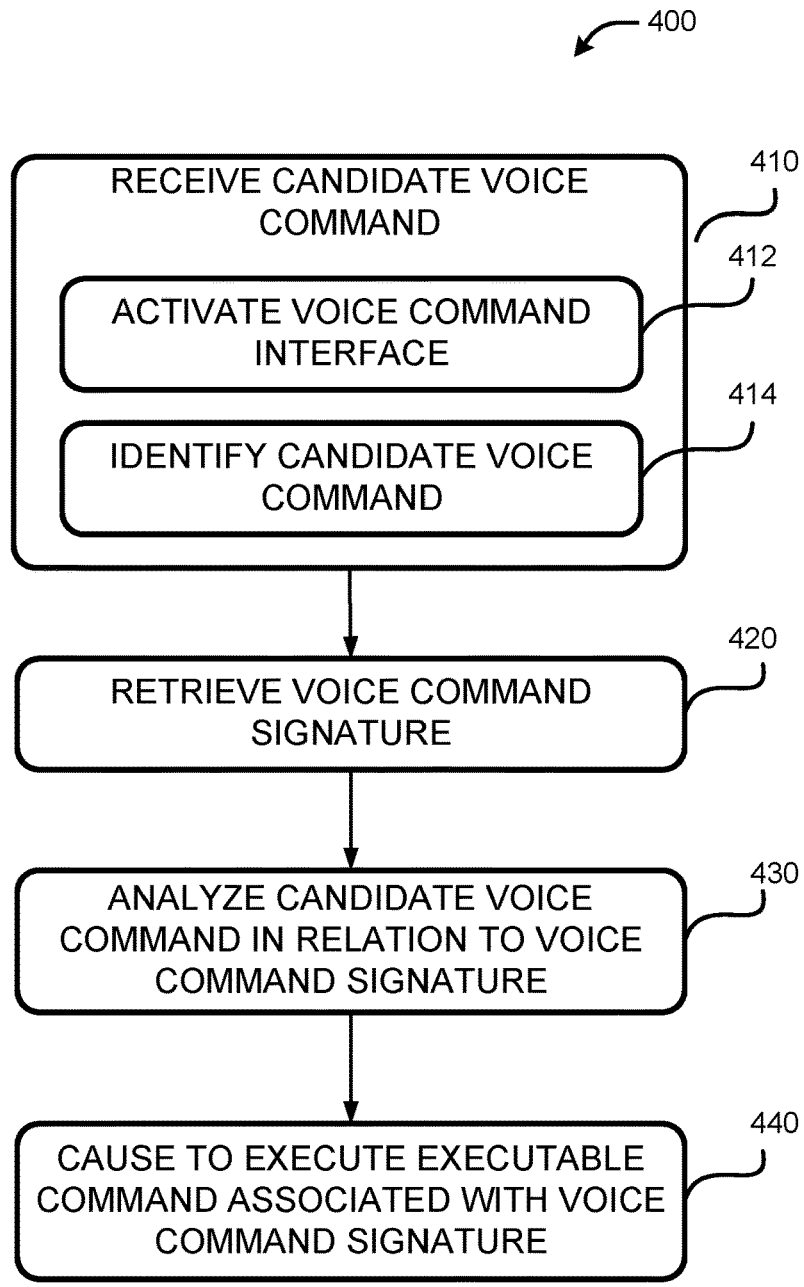
FIG. 4 illustrates another example operation process of the system of FIG. 2.

FIG. 4 illustrates an example process 400 of voice command executing module 250 of system 200. In example operation 410, voice command receiving unit 255 may receive a candidate voice command through voice recognition device 206 communicatively coupled to a related device 102, here e.g., device 102A.

Example operation 410 may include an example sub-operation 412, where voice command interface activation unit 257 may activate a user interface. The user interface may be configured to serve various functions. For example, the user interface may provide an environment for a candidate voice command input, may confirm a detected voice command from a background packet data session, and/or may serve as a dialog window(s) with the user. The user interface may be activated in different stages of receiving a training voice command. In an example, voice command interface activation unit 257 may activate an interface before receiving the candidate voice command and the interface may function to pause the relevant packet data session, e.g., a voice call, and switch to an environment to receive a voice command. In another example, voice command interface activation unit 257 may activate an interface after detecting a candidate voice command for receiving. For example, a candidate voice command may be detected from a background, such as an on-going voice conversation (packet data session), and an interface may be activated by voice command interface activation unit 257 for a user to confirm the detected voice command is the candidate voice command the user intends to input.

In example sub-operation 414, voice command identifying unit 259 may identify a candidate voice command over an on-going packet data session operated on related device 102A. Various approaches to identify a candidate voice command over an on-going packet data session may be used, and any and all are included in the disclosure. For example, voice command identifying unit 259 may identify a candidate voice command either as a foreground task or as a background task. The on-going packet data session may be paused or may be kept active and continue. As described herein, after a voice command is identified/detected, a user interface may be activated by voice command interface activation unit 257, in example sub-operation 412, for a use to confirm the voice command.

In example operation 420, retrieving unit 260 may retrieve a saved voice command signature. In an example, the retrieval may include converting the saved voice command signature into a format suitable for an analysis with respect to the received candidate voice command.

In example operation 430, analyzing unit 265 may analyze the received candidate voice command in relation to the retrieved voice command signature to determine a correspondence. There are various approaches to determine a correspondence between the received candidate voice command and the retrieved voice command signature, and all are included in the disclosure. In an example, analyzing unit 265 may process the received candidate voice command to identify a candidate content characteristic and a candidate sound characteristic. Then the candidate content characteristic and the candidate sound characteristic may be compared with the content characteristic and the sound characteristic of the voice command signature, respectively, to determine a correspondence on each one.

In an example, analyzing unit 265 may apply a tolerance range(s) in determining the correspondence. In an example, the tolerance ranges applied for the candidate content characteristic and the candidate sound characteristic may vary. A tighter tolerance may be set for the candidate sound characteristic to be determined as corresponding. For candidate content characteristic, the tolerance range may be set to be relatively loose.

In example operation 440, executing unit 270 may cause to execute the executable command associated with the voice command signature upon it is determined that the received candidate voice command corresponds to the retrieved voice command signature. In an example, availability checking unit 272 may check, e.g., through server 110, the availability of other related device 102 to participate into the inter-device communication event. For example, in the illustrative example voice command, "Transfer to Device 102B", availability checking unit 272 may check whether related device 102B is available to accept the transfer.

The processes described above in association with FIGS. 3-4 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
 receiving a training voice command of a user;
 processing the training voice command to generate a voice command signature having a content characteristic and a sound characteristic;
 associating the voice command signature with an executable command of inter-device communication between a first computing device and a second computing device based on the content characteristic and the sound characteristic, the executable command including a command to transfer an on-going packet data session that is occurring between the first computing device and a third computing device to the second computing device;
 saving, as a saved voice command signature, the voice command signature, the saved voice command signature being configured to be retrieved in an inter-device communication event;
 receiving, through a voice recognition device communicatively coupled to the first computing device, a candidate voice command;
 retrieving the saved voice command signature;
 analyzing the candidate voice command in relation to the saved voice command signature to determine a correspondence; and
 causing execution of the executable command associated with the saved voice signature upon determining that the candidate voice command corresponds to the saved voice command signature.

2. The method of claim 1, wherein processing the training voice command includes appending a randomly generated token to the training voice command to generate the voice command signature.

3. The method of claim 1, further comprising registering the voice command signature as associated with the executable command with a server supporting the inter-device communication.

4. The method of claim 1, wherein the analyzing includes applying a tolerance range in determining the correspondence.

5. The method of claim 1, further comprising identifying the candidate voice command over the on-going packet data session operated on the first computing device.

6. The method of claim 1, wherein the receiving the candidate voice command includes pausing the on-going packet data session to activate a user interface.

7. The method of claim 1, wherein the analyzing includes:
processing the candidate voice command to identify a candidate content characteristic and a candidate sound characteristic; and
comparing the candidate content characteristic and the candidate sound characteristic with the voice command signature.

8. The method of claim 1, wherein the on-going packet data session includes at least one of a voice call, a video call, a live messaging interaction, or a downloading of media files.

9. A computing device, comprising:
one or more processors;
memory; and
a plurality of programming instructions stored on the memory and executable by the one or more processors to implement:
a voice command processing unit configured to process a training voice command of a user to generate a voice command signature of the user, the voice command signature comprising a content characteristic and a sound characteristic;
an association unit configured to associate the voice command signature of the user with an executable command of inter-device communication between related computing devices, the executable command including a command to transfer an on-going packet data session that is occurring between the computing device and a communication device to at least one of the related computing devices;
a voice command receiving unit configured to receive, through a voice recognition device communicatively coupled to a first computing device of the related computing devices, a candidate voice command;
an analyzing unit configured to analyze the candidate voice command in relation to the voice command signature to determine a correspondence; and
an executing unit configured to cause execution of the executable command associated with the voice command signature upon determining that the received candidate voice command corresponds to the voice command signature.

10. The computing device of claim 9, wherein processing the training voice command includes appending a randomly generated token to the training voice command to generate the voice command signature.

11. The computing device of claim 9, further comprising a registration unit configured to register the voice command signature as associated with the executable command with a server supporting the inter-device communication.

12. The computing device of claim 9, wherein the voice command receiving unit further includes a voice command interface activation unit configured to activate a user interface to receive the candidate voice command.

13. The computing device of claim 9, wherein the voice command receiving unit further includes a voice command identification unit configured to identify the candidate voice command over the on-going packet data session operated on the first computing device.

14. The computing device of claim 9, wherein the analyzing unit is further configured to:
process the candidate voice command to identify a candidate content characteristic and a candidate sound characteristic; and
compare the candidate content characteristic and the candidate sound characteristic with the voice command signature.

15. The computing device of claim 9, wherein execution of the executable command includes transferring from a voice call between the computing device and the communication device to a video call between the computing device and the at least one of the related devices.

16. A computing device, comprising:
one or more processors;
memory; and
a plurality of programming instructions stored on the memory and executable by the one or more processors to implement:
a voice command receiving unit configured to receive, through a voice recognition device communicatively coupled to the computing device, a voice command;
a retrieving unit configured to retrieve a voice command signature of a user, the voice command signature being associated with an executable command, the executable command including a command to transfer an on-going packet data session that is occurring between the computing device and a communication device to a related computing device;
an analyzing unit configured to analyze the voice command in relation to the voice command signature to identify a content characteristic and a sound characteristic of the voice command; and
an executing unit configured to cause execution of the executable command upon the analyzing unit identifying a content characteristic and a sound characteristic of the voice command.

17. The computing device of claim 16, wherein execution of the executable command includes transferring from a voice call between the computing device and the communication device to a video call between the computing device and the related computing device.

* * * * *